Sept. 26, 1944.                J. H. FLYNN                2,359,027
                               PULLEY BLOCK
                         Filed March 30, 1942           2 Sheets-Sheet 1
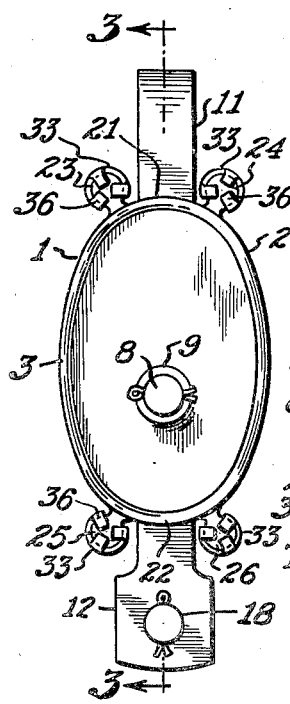
Fig.1.
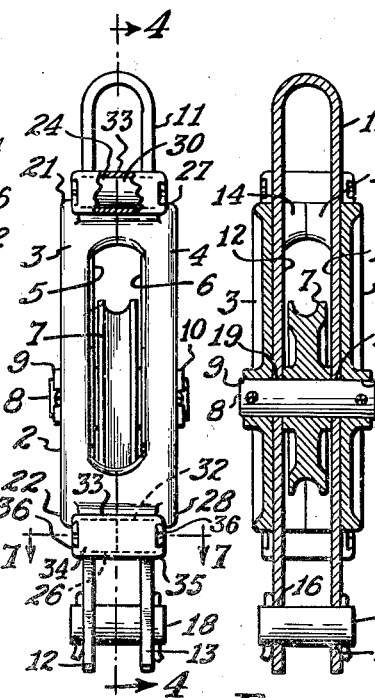
Fig.2.    Fig.3.
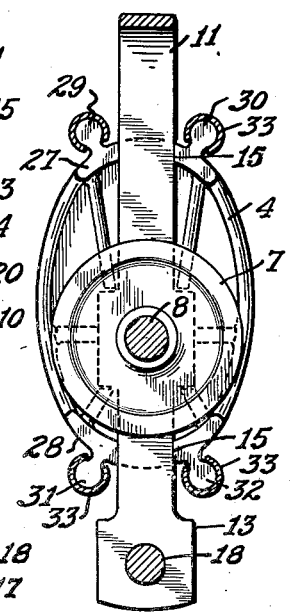
Fig.4.
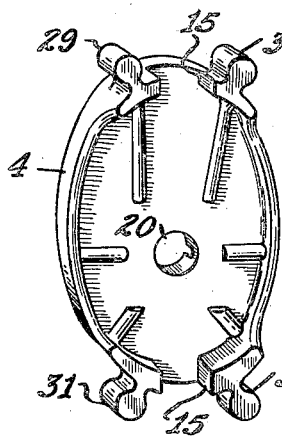
Fig.5.
Fig.6.
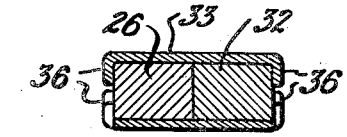
Fig.7.
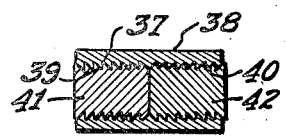
Fig.8.
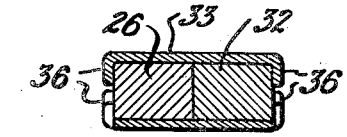
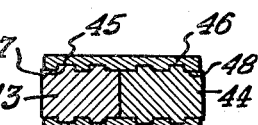
Fig.9.
Fig.10.
INVENTOR.
JOHN H. FLYNN.
BY
ATTORNEY.

Sept. 26, 1944.  J. H. FLYNN  2,359,027
PULLEY BLOCK
Filed March 30, 1942  2 Sheets-Sheet 2

INVENTOR.
JOHN H. FLYNN.
BY
ATTORNEY.

Patented Sept. 26, 1944

2,359,027

UNITED STATES PATENT OFFICE 2,359,027

PULLEY BLOCK

John H. Flynn, Cincinnati, Ohio

Application March 30, 1942, Serial No. 436,797

4 Claims. (Cl. 254—192)

The invention relates to means particularly adapted to prevent separation of pulley-block shells or cheeks from each other and for securing parts of pulley blocks in fixed relation with each other.

In the past considerable inconvenience and difficulty has been experienced by manufacturers of pulley blocks in securing the cheeks, or shells, separators, or partitions, and other parts of pulley blocks, in fixed relation with one another, and at the same time eliminating necessity of weakening parts of the pulley-block. In the conventional type of pulley-block, such as now in general use, bolts or pins are utilized to secure the pulley block body parts together. This structure necessitates drilling holes through the cheeks, or shells, and also through the separators or partitions for the purpose of receiving said bolts or pins. The drilled holes weaken the complete structure of the block and also considerable time and expense is required when constructing pulley blocks in this manner as jigs and other expensive equipment is required for drilling said holes and installing said pins or bolts.

Therefore, the important object of the invention is to provide simple, efficient and practical means adapted for utilization in quickly and conveniently securing the cheeks, or shells, and partitions or separators of pulley block bodies in fixed and stationary relation with one another, without sacrificing or weakening the normal tensile strength of the block body, and other parts.

Other objects of the invention are to provide practical and economical means for enabling persons, who desire to repair the pulley blocks, to quickly and conveniently disassemble and reassemble said blocks; and to provide means to secure the pulley block parts in predetermined fixed position without necessity of using bolts or pins in drilled holes.

Other objects of the invention will be apparent by reference to the drawings and hereinafter description.

The invention consists in the combination of the elements, arrangement of parts and in the details of the construction, as hereinafter claimed.

In the drawings:

Fig. 1 is a side elevational view of a single sheave pulley block;

Fig. 2 is an end elevational view of a single sheave pulley block, showing parts in dotted lines;

Fig. 3 is a section taken on the line 3—3 shown in Fig. 1;

Fig. 4 is a section taken on the line 4—4 shown in Fig. 2;

Fig. 5 is a perspective view of a cheek or shell;

Fig. 6 is a perspective view of the slotted tube or sleeve;

Fig. 7 is a section taken on the line 7—7 shown in Fig. 2;

Fig. 8 is a sectional view of a modification of a lug or ear, and sleeve;

Fig. 9 is another modification of a lug, or ear, and sleeve;

Fig. 10 is another modification of a lug or ear, and sleeve;

Figure 12:
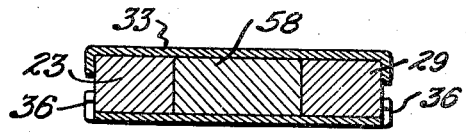
Fig. 12 is a section taken on the line 12—12 in Fig. 11.

In the preferred construction of the invention I provide the pulley block 1 comprising the block body 2. The body block consists of the shells, cheeks or housing sections 3 and 4 having recesses 5 and 6, in their inner sides, in which is mounted the pulley wheel 7 rotatable upon the spindle 8 having its ends mounted in the bearings 9 and 10 in the shells 3 and 4.

Received between the shells 3 and 4 is the U-shaped strap 11 having the legs 12 and 13 received in the slots 14 and 15 in the shells 3 and 4. The slots 14—14 and 15—15 are aligned, and the lower ends of the legs 12 and 13 have the holes 16 and 17 therein in which is received the pin 18 for supporting any suitable object or weight. In the legs 12 and 13 are the holes or bearings 19 and 20 aligned with the bearings 9 and 10 and in which the spindle 8 is mounted.

Integrally formed with the upper and lower ends 21 and 22 of the shell 3 are the outwardly pairs of upwardly and downwardly extending cylindrical lugs or ears 23 and 24 and 25 and 26, respectively. Integrally formed with the upper and lower ends 27 and 28 of the shell 4 are the pairs of upwardly and downwardly extending cylindrical lugs or ears 29 and 30, and 31 and 32.

The ears 23 and 29; 24 and 30; 25 and 31; 26 and 32 are aligned with each other, respectively, and their inner ends contact each other, as shown in Fig. 2. The ears are inclined outwardly and the upper end of the strap 11 is positioned between the ears 23 and 29, and 24 and 30, and the lower end of the strap 11 is positioned between the ears 25 and 30, and 26 and 32.

As will be hereinafter explained, the purpose of the ears 23, 29, 24, 30, 25, 31, 26 and 32 is to receive a means to retain the inner ends of the various ears in contact with each other whereby the shells 3 and 4 are retained in fixed position with each other and the various parts as the strap 11, pulley wheel 7 are secured in assembled position as shown in Figs. 1, 2, 3 and 4.

For the purpose of securing the cheeks 3 and 4 in fixed relation with each other, after the pulley wheel 7 is rotately mounted upon the spindle 8 and the strap 11 is positioned between the shells 3 and 4, a slotted sleeve 33 is slid over each of the pair of ears 23 and 29; 24 and 30; 25 and 31; and 26 and 32. Formed on the ends 34 and 35 of the sleeves 33 are the lips 36. The lips 36, of the sleeves 33 are manually, or otherwise, bent inwardly and in close contact with the outer ends of the ears, as shown in Figs. 1, 2 and 3, whereby the inner ends of the pairs of ears are retained in close contact with each other thereby retaining the shells 3 and 4, pulley wheel 7, and strap 11 in assembled position.

In Fig. 8 is shown a modification of the invention of which the inwardly extending teeth 37, formed on the inside of the sleeve 38 mesh with the teeth 39 and 40 formed on the outer surface of the ears 41 and 42 whereby the inner ends of the ears are retained in close contact with each other. The ears 23, 29, 24, 30, 25, 31, 26 and 32, shown in Figs. 1 to 5 inclusive may be formed with the teeth 39 and 40 shown in Fig. 8 and the sleeves 33 may be substituted for the sleeves 38.

In Fig. 9 is shown another modification of the invention in which the ears 43 and 44 have formed on their outer surface the spaced apart ribs 45 and 46 which are received in the grooves 47 and 48 formed on the inside of the sleeve 49.

In Fig. 10 is shown another modification of the invention in which on one end of the ear 50 is formed a rib 51, whose sides 52 are inclined outwardly and mesh with the groove 53 in the adjacent ear 54 whereby the inner ends of the ears 50 and 54 are retained in close contact with each other. The sleeve 55 received around the ears 50 and 54 retain the ears in a line position with each other. The sleeves 38, 49 and 55, respectively, referred to in the above paragraphs and shown in Figs. 8, 9, and 10 are forced onto their respective ears by suitable machines or by manually pounding them thereon by use of a suitable hammer.

Figure 11:
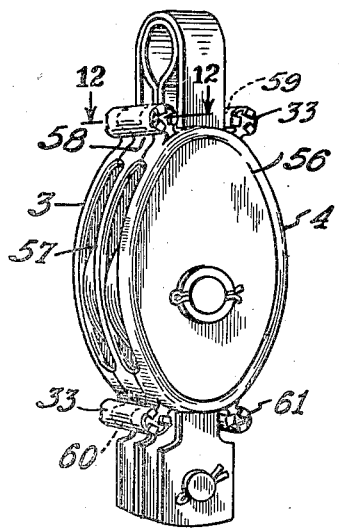
Fig. 11 is a perspective view of a double sheave pulley block having the invention incorporated therewith.
Figure 14:
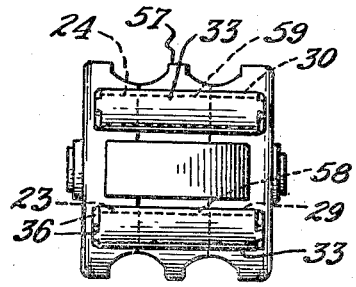
Fig. 14 is a top view of the same.
Figure 13:
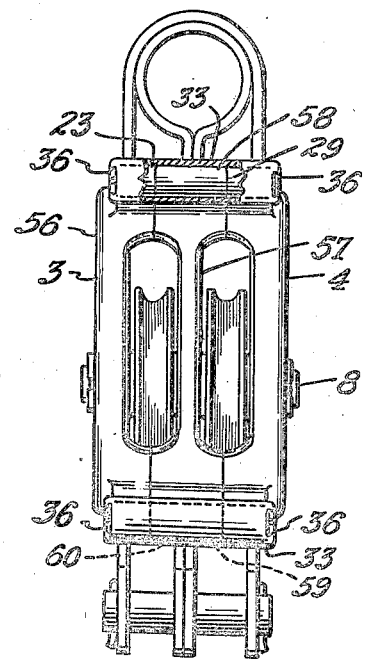
Fig. 13 is an edge elevational view of the double sheave pulley block shown in Fig. 11.

In Fig. 11 is shown a double sheave pulley block 56 having the cheeks 3 and 4 separated from each other as by the partition 57 having formed on its upper end the outwardly extending ears 58 and 59 respectively, in alignment with the ears 23—29 and 24—30. Formed on the lower end of the partition are the ears 60 and 61 aligned with the ears 25—31, 26—32. The slotted sleeves 33 are slid over the respective ears and the lips 36 are bent inwardly for the purpose of retaining the cheeks 3 and 4 and the partition 57 in fixed relation with one another.

An advantage of the invention is that the parts of a pulley block may be quickly and conveniently assembled and retained in fixed relation with one another without necessity of drilling holes in the block parts, whereby the tensile strength of the pulley block parts is not affected, weakened or reduced.

Another advantage of the invention is that when it is desired to disassemble the pulley block shown in Figs. 1, 2, 3, 4, and 11, for making repairs, or for other purposes it is necessary simply to slide the slotted tube or sleeve 33 from the ears or lugs and in the double sheave shown in Fig. 11 the partition 57, whereby the cheeks 3 and 4, may be manually forced from each other to permit removal of the pulley wheel or wheels 7, and the spindle on which the wheel or wheels are rotatably mounted.

It is, therefore, quite apparent that I have devised a simple efficient and practical device for the intended purpose of retaining the shells and other parts of pulley blocks in predetermined stationary or fixed relation to each other, and which may be utilized conveniently and economically. While I have, in the present instance, shown and described preferred embodiments thereof, which will give in practice satisfactory and reliable results, it is to be understood that the same is susceptible of modification in various particulars. And the parts of the invention may be of any size and constructed of any materials deemed convenient and suitable for an article of this character, I wish to emphasize the fact that I desire to include in this application all equivalents and substitutes that may fairly be considered to come within the scope and purview of the inventon, as defined in the claims.

What I claim as new and desire to secure by Letters Patent is:

1. A pulley block comprising a pair of shells, a pulley wheel rotatably mounted in fixed position between said shells, and a strap between said shells and in fixed position with respect to said wheel and shells, the upper ends of each of said shells having formed thereon a pair of spaced apart ears, said strap being between the ears of each shell, the ears of said pair of ears on one said shell being aligned with the ears in the pair of ears on the other said shell, the inner ends of the pairs of ears being in contact with each other, a pair of sleeves received on the aligned ears, and means to retain said sleeves in fixed position on said ears.

2. A pulley block comprising a pair of shells, a pulley wheel rotatably mounted between said shells, means to support said wheel in fixed position with respect to said shells, and a strap between said shells, said means supporting said wheel in fixed position with respect to said strap, the upper ends of each of said shells having formed thereon a pair of spaced apart ears, said strap being between the ears of each shell, the ears of said pair of ears on one said shell being aligned with the ears in the pair of ears on the other said shell, a pair of sleeves received on the aligned ears, and means to retain said sleeves in fixed position on said ears.

3. A pulley block comprising a pair of shells, a pulley wheel rotatably mounted between the shells, a U-shape strap positioned between the shells, said wheel being positioned between the legs of said strap, and means to retain said wheel, shells and strap in predetermined positions, each of said shells having a pair of spaced apart ears thereon, said strap being positioned between the ears of the respective pairs of ears, means on each of said pairs of ears for retaining said shells in fixed relation with each other.

4. In a pulley block, a pair of cheeks having cylindrical ears integrally formed with their upper and lower ends, a partition between said cheeks and having cylindrical ears integrally formed with its upper and lower ends and being in alignment with said first mentioned ears, a pair of pulley wheels one of which is rotatably mounted between one of said cheeks and said partition, and cylindrical means slidably received over said cheek ears and said partition ears adapted to retain said cheeks and partition in fixed relation with one another.

JOHN H. FLYNN.